United States Patent
Ito et al.

(10) Patent No.: US 8,089,712 B2
(45) Date of Patent: Jan. 3, 2012

(54) ABNORMALITY DETERMINING APPARATUS

(75) Inventors: Mikio Ito, Kawasaki (JP); Eisaku Takahashi, Kawasaki (JP); Hidejirou Daikokuya, Kawasaki (JP); Kazuhiko Ikeuchi, Kawasaki (JP); Hideo Takahashi, Kawasaki (JP); Yoshihito Konta, Kawasaki (JP); Norihide Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 205 days.

(21) Appl. No.: 12/320,591

(22) Filed: Jan. 29, 2009

(65) Prior Publication Data

US 2009/0290247 A1     Nov. 26, 2009

(30) Foreign Application Priority Data

May 23, 2008   (JP) .................. 2008-135743

(51) Int. Cl.
  *G11B 27/36* (2006.01)
  *G01R 31/28* (2006.01)
(52) U.S. Cl. .......... 360/31; 714/47.1; 714/47.2
(58) Field of Classification Search .......... None
  See application file for complete search history.

(56) References Cited

U.S. PATENT DOCUMENTS

| | | |
|---|---|---|
| 6,607,824 B2 | 8/2003 | Horai et al. |
| 6,797,374 B2 | 9/2004 | Horai et al. |
| 2006/0034008 A1* | 2/2006 | Kojima et al. .......... 360/53 |

FOREIGN PATENT DOCUMENTS

| | | |
|---|---|---|
| JP | 5-298132 | 11/1993 |
| JP | 9-261278 | 10/1997 |
| JP | 10-283122 | 10/1998 |
| JP | 10-320131 | 12/1998 |
| JP | 2001-265538 | 9/2001 |
| JP | 2002-245613 | 8/2002 |
| JP | 2002-342532 | 11/2002 |
| JP | 2003-6875 | 1/2003 |
| JP | 2004-152157 | 5/2004 |
| JP | 2004-253087 | 9/2004 |
| JP | 2005-122756 | 5/2005 |
| JP | 2006-147146 | 6/2006 |
| JP | 2007-241837 | 9/2007 |
| JP | 2007-323499 | 12/2007 |
| JP | 2008-511082 | 4/2008 |
| JP | 2008-511083 | 4/2008 |
| JP | 2008-511084 | 4/2008 |
| WO | 98/41915 | 9/1998 |
| WO | 03/010763 A1 | 2/2003 |

OTHER PUBLICATIONS

Japanese Office Action issued Jun. 8, 2010 in corresponding Japanese Patent Application 2008-135743.
Japanese Office Action issued Feb. 26, 2010 in corresponding Japanese Patent Application 2008-135743.

* cited by examiner

*Primary Examiner* — Daniell L Negron
*Assistant Examiner* — Regina N Holder
(74) *Attorney, Agent, or Firm* — Staas & Halsey LLP

(57) ABSTRACT

In a RAID apparatus, an error determining processing unit determines whether an HDD is normal based on an error determining condition obtained from an amount of increase of NON MEDIUM ERROR COUNT and the number of accesses memorized on a control table, and detects the HDD with abnormal performance.

9 Claims, 6 Drawing Sheets

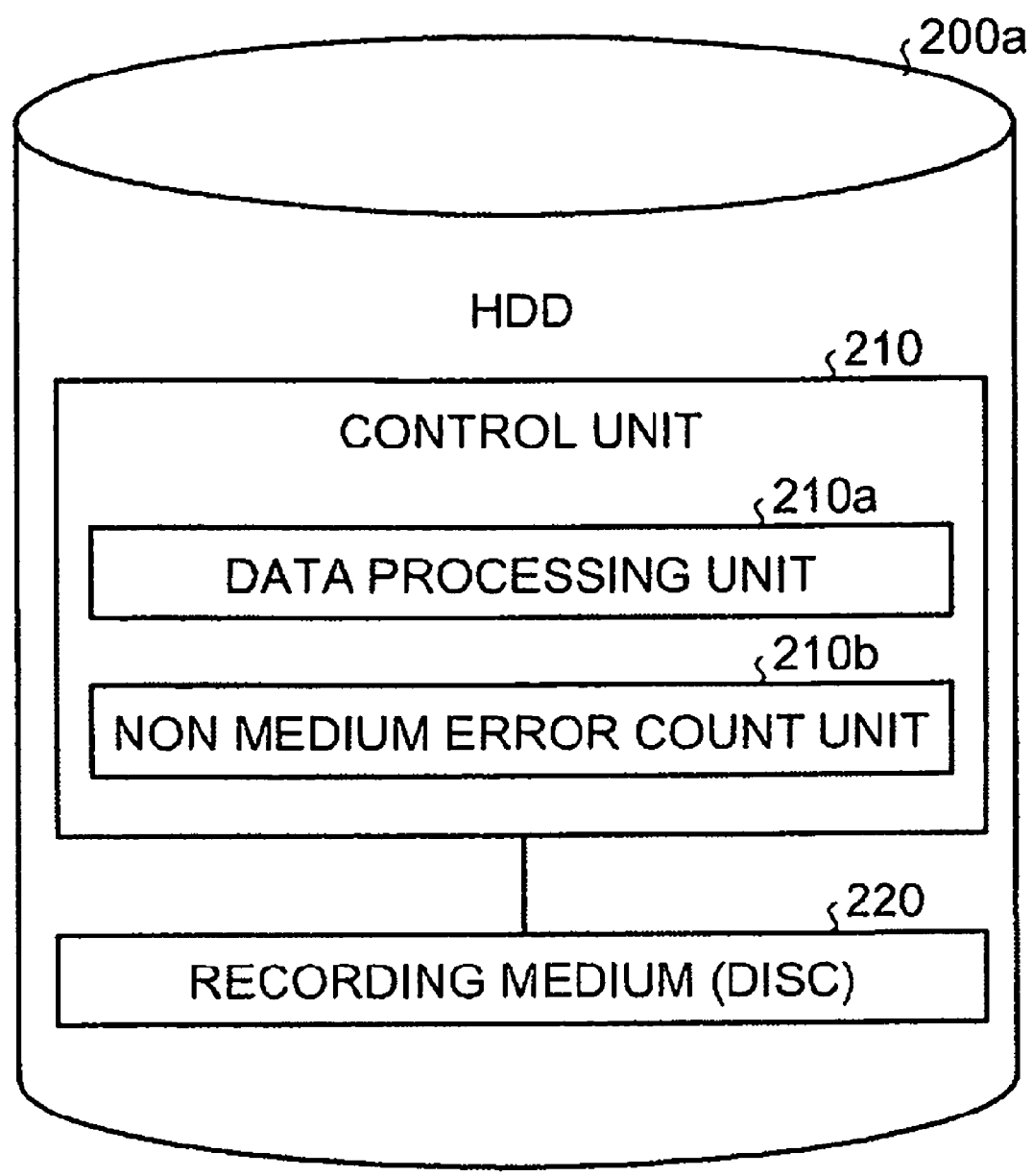

FIG.3

CONTROL TABLE 420b

| HDD/ NON MEDIUM ERROR COUNT/NUMBER OF ACCESSES | PERIOD | A | B | C | D | E | F | G | H | ... |
|---|---|---|---|---|---|---|---|---|---|---|
| HDD (A) | NON MEDIUM ERROR COUNT | 200 | 350 (Δ150) | | | | | | | |
| | NUMBER OF ACCESSES | 200000 | 17000 | | | | | | | |
| HDD (B) | NON MEDIUM ERROR COUNT | 38 | 45 (Δ7) | 65 (Δ20) | 85 (Δ20) | 135 (Δ50) | | | | |
| | NUMBER OF ACCESSES | 15000 | 3000 | 1000 | 4600 (D1:500) | 7200 | | | | |
| HDD (C) | NON MEDIUM ERROR COUNT | 90 | 100 (Δ10) | 120 (Δ20) | 123 (Δ3) | 130 (Δ7) | 135 (Δ5) | 140 (Δ5) | 155 (Δ15) | |
| | NUMBER OF ACCESSES | 25000 | 5000 | 4500 | 3000 | 3500 | 2000 | 1500 | 7200 | |
| ... | ... | ... | ... | ... | ... | ... | ... | ... | ... | ... |
| HDD (Z) | NON MEDIUM ERROR COUNT | n1 | n2 | n3 | n4 | n5 | n6 | n7 | n8 | |
| | NUMBER OF ACCESSES | m1 | m2 | m3 | m4 | m5 | m6 | m7 | m8 | |

[LEGEND]
FIGURE IN PARENTHESES INDICATES AMOUNT OF INCREASE OF NON MEDIUM ERROR COUNT.
*HOWEVER, D1:500 INDICATES NUMBER OF ACCESSES IN PERIOD D1.

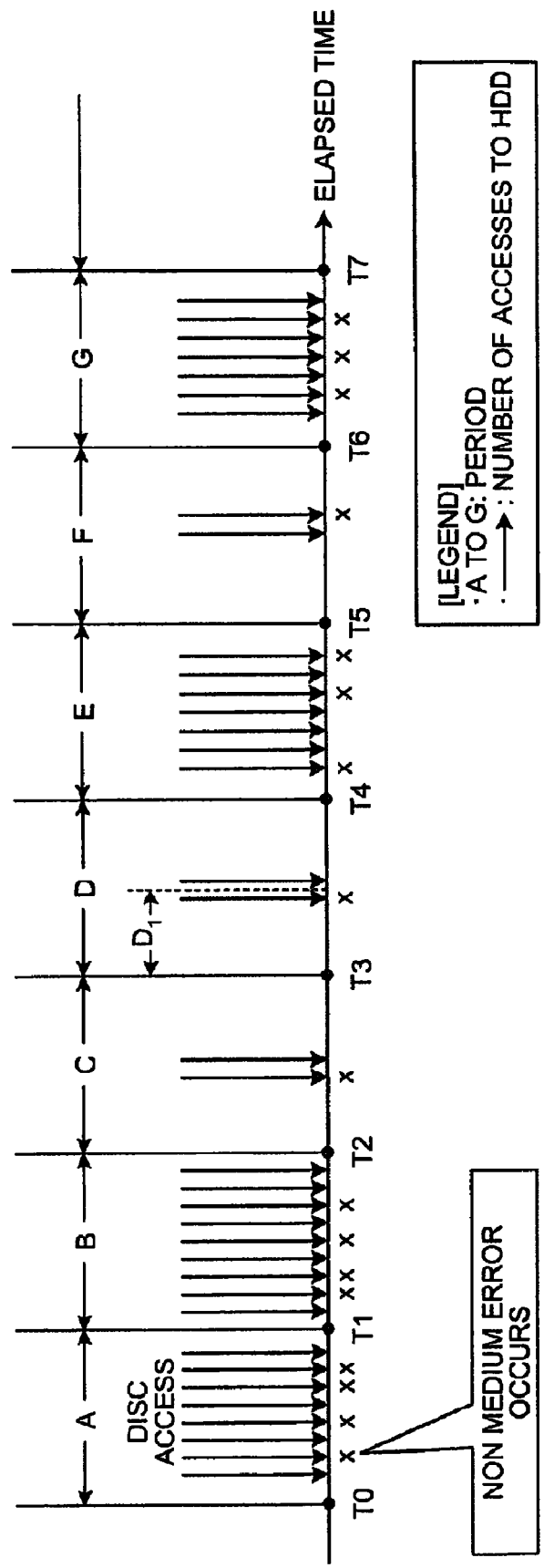

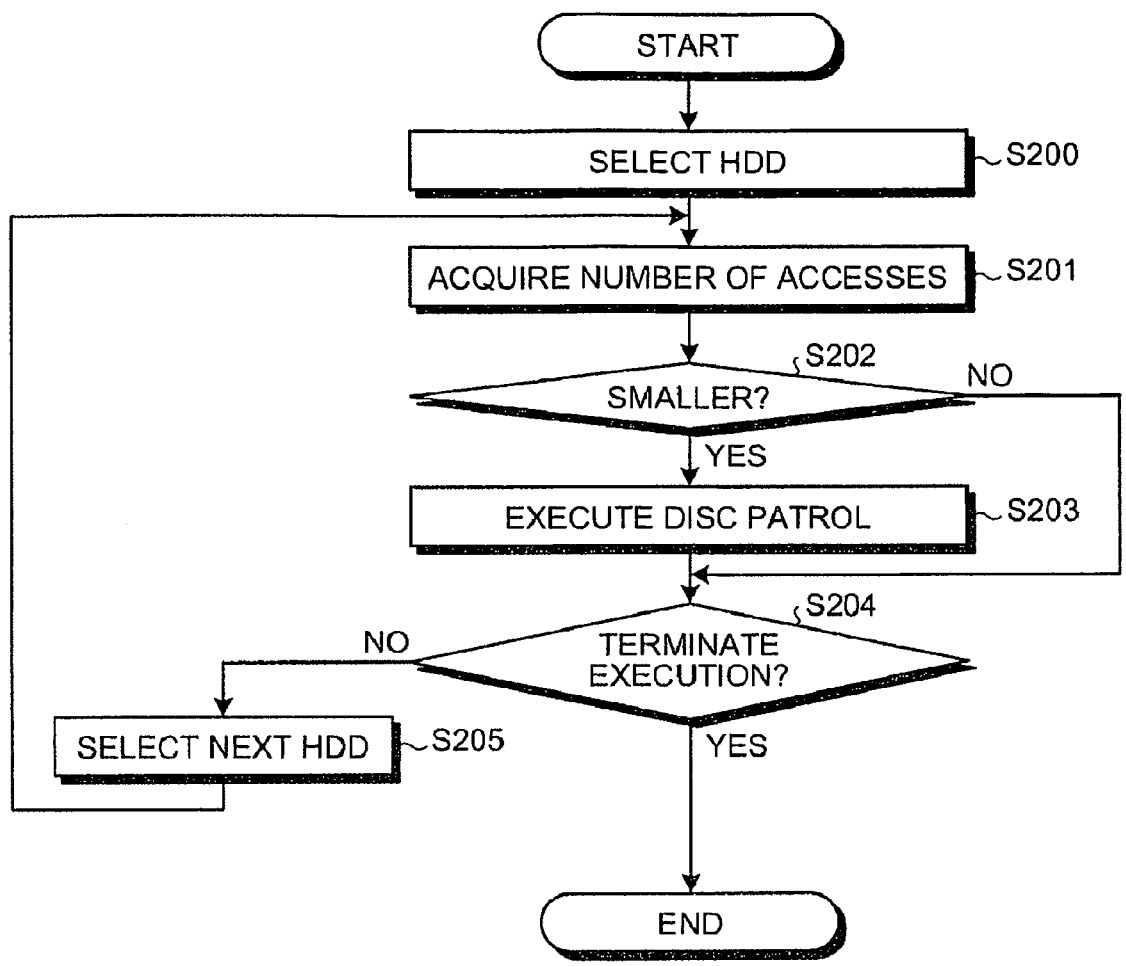

ABNORMALITY DETERMINING APPARATUS

CROSS-REFERENCE TO RELATED APPLICATIONS

This application is based upon and claims the benefit of priority of the prior Japanese Patent Application No. 2008-135743, filed on May 23, 2008, the entire contents of which are incorporated herein by reference.

FIELD

The present invention relates to an abnormality determining apparatus that detects the number of errors of an HDD (hard disc drive), and more particularly, to an abnormality determining apparatus capable of securely detecting an abnormal HDD, based on an amount of increase in the number of errors not attributable to a recording medium.

BACKGROUND

An information system of an enterprise that provides various services (for example, a system that manages a usage fee of communication facilities involved in connection between telecommunications carriers of respective cellular phones) stores data in a storage system such as a RAID (redundant arrays of inexpensive discs) to enhance reliability of data used at the time of providing services. This storage system is provided with various data protection functions and by, for example, periodically inspecting errors of each HDD (hard disc drive) provided in the storage system, forestalls problems such as a loss of data.

There are two types of errors occurring to a conventional storage system; the error attributable to a recording medium of the HDD and the error not attributable to the recording medium. As to a method of detecting the error attributable to the recording medium, the error is detected by, for example, writing test data to the recording medium and checking whether the written test data may properly be read out.

On the other hand, with respect to the method of detecting the error not attributable to the recording medium, there are methods such as the method of giving attention to I/O (input/output) of the HDD with a low processing load and, in the case of occurrence of a delay in a response time to such HDD, determining that the error has occurred to the HDD to which the response delay has occurred and the method of determining that the error has occurred when there is a bias in I/O access to the HDDs in a RAID group.

Japanese Patent Application Laid-open No. 5-298132 discloses a method of avoiding the error by determining whether to blockade a part in which the error has occurred from the number of times of occurrence of the error, the frequency of occurrence of the error, and the interval of occurrence of the error. Further, Japanese Patent Application Laid-open No. 2001-265538 discloses a technology of performing an inspection with respect to a plurality of inspection items and forecasting the error that can occur to the disc from a combination of inspection results.

However, the above conventional technologies had a problem of erroneously detecting the error not attributable to the recording medium of the HDD and erroneously detecting a normal HDD as an abnormal HDD.

For example, in the method of detecting the error based on the delay in the response time, there has been a case in which, when the HDD's self-diagnosing processing and data access compete with each other, data processing is performed after the self-diagnosis and as a result, the occurrence of the response delay is erroneously detected and the normal HDD is detected as the abnormal HDD.

In the method of detecting the error based on the bias of the I/O access, in the case of a random I/O where it is possible that the data access temporarily concentrates on a particular HDD, there has been a problem of erroneously detecting the occurrence of the response delay and detecting the normal HDD as the abnormal HDD.

The above erroneous detection of the normal HDD as the abnormal HDD may be reduced by changing a threshold for determining as the response delay but in this case, conversely, it becomes difficult to reliably detect the abnormal HDD.

As seen above, in the present state, the conventional technologies, unable to accurately detect the error not attributable to the recording medium of the HDD, are not capable of properly determining whether the HDD is normal.

SUMMARY

It is an object of the present invention to at least partially solve the problems in the conventional technology.

According to an aspect of an embodiment, an abnormality determining apparatus includes a counting unit that counts a number of errors not attributable to a recording medium provided in a storage device; and an abnormality determining unit that calculates an amount of increase of the number of errors based on results of counting by the counting unit and determines whether the storage device is abnormal based on the amount of increase of the number of errors.

According to another aspect of an embodiment, an abnormality determining method includes counting a number of errors not attributable to a recording medium provided in a storage device and storing the number of errors in the storage device; and calculating an amount of increase of the number of errors based on results of counting of the number of errors stored in the storage device and determining whether the storage device is abnormal based on the amount of increase.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 2 is a functional block diagram of one example of a configuration of an HDD according to the first embodiment;

FIG. 3 is a chart of one example of data structure of a control table according to the first embodiment;

FIG. 4 is a chart of one example of occurrence of a non medium error according to the first embodiment;

FIG. 6 is a flow chart of Disc Patrol processing in the first embodiment.

DETAILED DESCRIPTION OF EMBODIMENT(S)

Preferred embodiments will now be described in detail of an abnormality determining apparatus according to the present invention with reference to the accompanying drawings. A RAID (redundant arrays of inexpensive discs) apparatus as a first embodiment of the abnormality determining apparatus will be described.

Firstly, main terms will be described that are used in the following first embodiment. "RAID (redundant arrays of inexpensive discs)" refers to a technology or system of controlling a plurality of HDDs as a single disc system and is designed to implement an increased speed of data processing, countermeasures for forestalling a data loss, etc.

"Non medium error" refers to an error not attributable to a recording medium and, for example, refers to the error by which it takes as much as 100 or more milliseconds until finishing of an HDD retrial operation. "NON MEDIUM ERROR COUNT" refers to the number of NON MEDIUM ERRORs collected by the HDD itself.

"Number of accesses" refers to the number of times a CPU (central processing unit) has performed data writing (inputting) or reading (outputting) to or from a memory or the HDD.

"IOPS (input output per second)" refers to the number of accesses per second and indicates a data processing capability of the HDD.

Outline and characteristics will then be described of the RAID apparatus according to the first embodiment. The RAID apparatus according to the first embodiment determines the HDD to be abnormal when the amount of increase of the NON MEDIUM ERROR COUNT for a unit number of accesses of the HDD is in excess of a prescribed value and the amount of increase of the NON MEDIUM ERROR COUNT is in excess of an allowable number of errors. When the number of accesses to the HDD for a predetermined period of time does not come up to conditions for detecting the abnormal HDD, the RAID apparatus properly increases such number of accesses.

As seen above, the RAID apparatus according to the first embodiment is capable of properly determining the abnormal HDD, based on the amount of increase of the NON MEDIUM ERROR COUNT and as a result, is capable of properly detecting the HDD that so far could not be detected as the abnormal HDD and disconnecting such HDD from the storage system.

Figure 1:
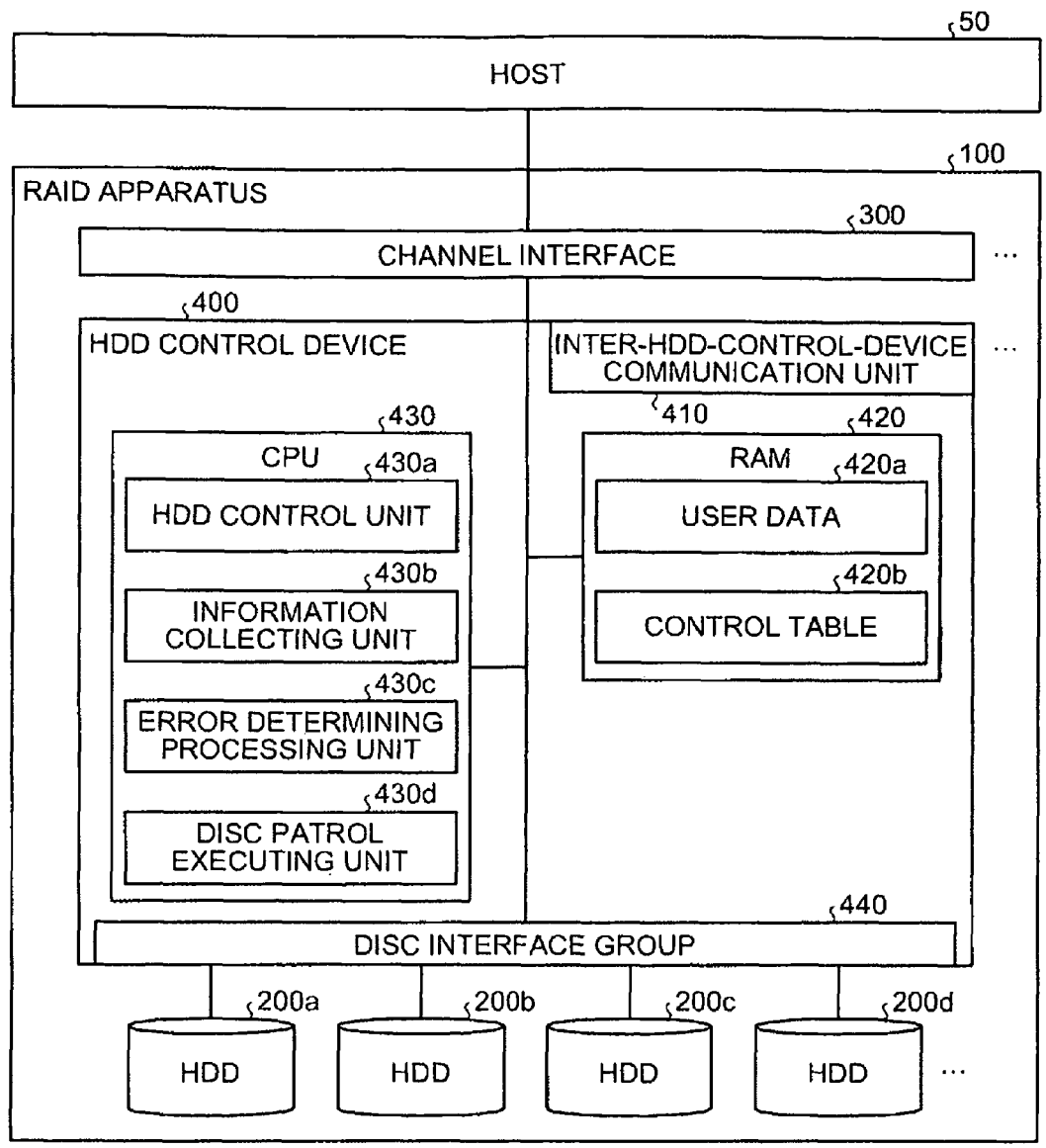
FIG. 1 is a functional block diagram of a configuration of a RAID apparatus according to a first embodiment.

Configuration will then be described of a RAID apparatus 100 according to the first embodiment. FIG. 1 is a functional block diagram of the configuration of the RAID apparatus 100 according to the first embodiment. As shown in FIG. 1, the RAID apparatus 100 is equipped with a plurality of HDDs making up a RAID group such as an HDD 200a, an HDD 200b, an HDD 200c, an HDD 200d, . . . and has a channel interface 300 and an HDD control device 400. The RAID apparatus 100 has a plurality of HDD control devices to secure redundancy.

Since the plurality of HDDs such as the HDD 200a, the HDD 200b, the HDD 200c, the HDD 200d, . . . that make up the RAID group are the HDDs possessed by the RAID apparatus 100, data is distributed among these HDDs depending on the level of high speed and safety.

Each HDD within the RAID group will then be described, taking example of the HDD 200a. FIG. 2 is a functional block diagram of one example of a configuration of the HDD. As shown in FIG. 2, the HDD 200a is equipped with a storage medium (disc) 220 to which data is written and which memorizes a program and a control unit 210.

The control unit 210 includes, as units closely related to the present invention, a data processing unit 210a and a NON MEDIUM ERROR COUNT unit 210b.

The data processing unit 210a is a unit of writing or reading the data to or from the storage medium 220 in response to a processing instruction from the HDD control device 400.

The data processing unit 210a is a unit of increasing the number of accesses of the HDD that has a small number of accesses, in response to a Disc Patrol executing instruction from the HDD control device 400.

The NON MEDIUM ERROR COUNT unit 210b is a unit of recording the NON MEDIUM ERROR COUNT recorded by the HDD 200a itself.

Now, back to the description of FIG. 1, the channel interface 300 will be described. The channel interface 300 is a unit of controlling transmission and reception of the data between a host 50 and the HDD control device 400.

The HDD control device 400 will then be described. As shown in FIG. 1, the HDD control device 400 includes an inter-HDD-control-device communication unit 410, a RAM (random access memory) 420, a CPU (central processing unit) 430, and a disc interface group 440.

The inter-HDD-control-device communication unit 410 is a unit of controlling transmission and reception of the data to or from HDD control devices different from the HDD control device 400.

The RAM 420 is a unit of temporarily memorizing the data, etc., to be written to respective HDDs making up the RAID group and includes user data 420a and a control table 420b.

The user data 420a is a memory unit of memorizing the user data to be written from the host 50 and the data read out from the respective HDDs making up the RAID group (detailed data structure omitted).

The control table 420b is a table of memorizing the value recorded by the NON MEDIUM ERROR COUNT unit of the HDD within the RAID group and the number of accesses recorded by the HDD control device.

FIG. 3 is a chart of one example of the data structure of the control table. As shown in FIG. 3, the control table 420b is a table of memorizing identification information of the HDD within the RAID group, the NON MEDIUM ERROR COUNT, the number of accesses, and the period within which these values are collected.

Specific description will be given with reference to FIG. 4. FIG. 4 is a chart of one example of occurrence of the NON MEDIUM ERROR. "A" as one example of the period shown in FIG. 4 indicates the period from time T0 to time T1. By way of example, T0 indicates the time, etc., at which the access from the host to the HDD starts.

On the other hand, "B" as one example of the period indicates the period from time T1, ending time of period A, taken as a measuring start time until time T2. Period "C" indicates the period from time T2, the ending time of period "B", taken as the measuring start time until time T3.

Then, with respect to period "D", etc., as well, in alphabetical order, each alphabet period indicates the period from time Tn, the ending time of the immediately preceding alphabet period in alphabetical order, taken as the measuring start time until time Tn+1. For example, period "E" indicates the period from time T4, the ending time of the immediately preceding alphabet period in alphabetical order, taken as the measuring start time until time T5.

From the above, in FIG. 3, "A" corresponds to the period from time T0 until time T1 and, with respect to "B" and so forth, the period from time Tn, the ending time of the immediately preceding alphabet period in alphabetical order, taken as the measuring start time until time Tn+1 is memorized.

The control table 420b memorizes the identification information of the HDD within the RAID group, the NON MEDIUM ERROR COUNT, and the number of accesses for each of the periods indicated by alphabet by way of example.

Therefore, FIG. 3 indicates that in period A, the HDD(A) has had 200000 accesses as the number of accesses and cumulative 200 commands of NON MEDIUM ERROR COUNT for such number of accesses.

FIG. 3 additionally indicates that in period B, the HDD(A) has had 17000 accesses as the number of accesses and cumulative 350 commands of NON MEDIUM ERROR COUNT.

Therefore, since 350 commands of NON MEDIUM ERROR COUNT have occurred up to the end of period B, the NON MEDIUM ERROR COUNT has increased by 150 commands between the end of period A and the end of period B.

When the HDD control device 400 determines and detects the HDD(A) as an abnormal HDD at time T2, the ending time of period B, the HDD(A) is removed from the RAID apparatus 100 and no record is made of the NON MEDIUM ERROR COUNT or the number of accesses of the HDD (A) in period C and thereafter.

The CPU 430 will then be described. As shown in FIG. 1, the CPU 430 includes an HDD control unit 430a, an information collecting unit 430b, an error determining processing unit 430c, and a Disc Patrol executing unit 430d.

The HDD control unit 430a is a unit of performing, to the data processing unit 210a, processing of an instruction to write the data from the host 50 to each HDD within the RAID apparatus 100 and processing of an instruction to read out the written data.

The information collecting unit 430b is a unit of registering the NON MEDIUM ERROR COUNT recorded in each HDD within the RAID group on the control table 420b.

In addition, the information collecting unit 430b is a unit of recording the number of accesses to each HDD (for example, the number of accesses, etc., to be issued by execution of the Disc Patrol) and is also a unit of registering the recorded number of accesses on the control table 420b.

Processing will then be described that is performed by the error determining processing unit 430c. The error determining processing unit 430c is a unit of referring to the control table 420b and determining the HDD to be abnormal when the amount of increase of the NON MEDIUM ERROR COUNT for a unit number of accesses to each HDD within the RAID group (hereinafter, error determining coefficient) is in excess of a prescribed value of the normal HDD (hereinafter, error monitoring coefficient) and furthermore, the amount of increase of the NON MEDIUM ERROR COUNT is in excess of the allowable number of errors. The error determining processing unit 430c does not determine whether the HDD is abnormal with respect to the HDD with low access load.

The allowable number of errors indicates an arbitrary number of accesses corresponding to 0.5% of a minimum number of accesses that enables the error determining processing unit 430c to determine whether the HDD is abnormal.

A difference between the normal HDD and the abnormal HDD will firstly be described based on the amount of increase of the NON MEDIUM ERROR COUNT.

Generally speaking, there is a viewpoint that the access processing of the normal HDD can tolerate response lowering of up to 5% as an allowable limit. The number of accesses corresponding to such 5% is taken as the error monitoring coefficient and details thereof will be given below.

There is a viewpoint that the number of accesses associated with the response lowering is in correspondence with the amount of increase of the NON MEDIUM ERROR COUNT.

For example, if, in a certain number of accesses, the amount of increase of the NON MEDIUM ERROR COUNT is 7 commands, it means occurrence of the response lowering corresponding to 7 accesses.

It is known that the response time at the time of the normal HDD processing one access is 10 [ms] (millisecond) per access, while the response time at the time of the abnormal HDD processing one access is 100 [ms] per access.

With the above points taken into account, an example will be given of a specific calculating formula for determining the abnormal HDD.

The response time when the normal HDD processes 1000 accesses is as follows:

1000 accesses×10 [ms]=10 [s] (second)

Processing performance of the normal HDD is as follows:

1000 accesses/10.00 [s]=100 [IOPS]

On the other hand, when a certain HDD (e.g., HDD1) processes 1000 accesses, with 993 accesses as the number of accesses normally processed and 7 accesses as the number of accesses abnormally processed, the response time in the case of processing these numbers of accesses respectively is as follows:

The response time is 993 accesses×10 [ms]+7 accesses× 100 [ms]=10.63 [s] and as compared with the response time obtained by the normal HDD processing alone, a delay of 0.63 [s] has occurred.

The processing performance of the HDD1 is 1000 accesses/10.63 [s]=94 [IOPS].

The above indicates that if the processing performance of the normal HDD is given as 100 [IOPS], since the processing performance of the HDD1 is 94 [IOPS], 6% performance lowering, on a basis of the unit of IOPS, has occurred to the HDD1.

Therefore, on the ground that 5% performance lowering as the allowable limit of the normal HDD is exceeded, the HDD1 is determined to be an abnormal HDD.

While whether the HDD is a normal HDD has been determined on the basis of 5% as the allowable limit of the normal HDD, since the number of accesses associated with the response lowering is in correspondence with the amount of increase of the NON MEDIUM ERROR COUNT, the allowable limit of 5% may be converted to 0.5% in terms of the number of accesses. A prescribed value indicated by this 0.5% is taken as the error monitoring coefficient.

For example, if 7% performance lowering, on a basis of the unit of IOPS, has occurred to the HDD, it means that 7 commands of the NON MEDIUM ERROR COUNT have occurred for 1000 accesses processed by the HDD and the ratio of the NON MEDIUM ERROR COUNT to this number of accesses is 0.7%.

Therefore, when the IOPS lowering is 7%, calculation of converting this value to the number of accesses is as follows:

7 commands/1000 accesses=0.7%

Likewise, if 5% performance lowering, on a basis of the unit of IOPS, occurs to the HDD, it means that 5 commands of the NON MEDIUM ERROR COUNT occur for 1000 accesses and the ratio of the NON MEDIUM ERROR COUNT to this number of accesses is 0.5% (corresponding to the error monitoring coefficient).

Specific formula for calculating the error monitoring coefficient is as follows:

5 command/1000 accesses=0.5% (error monitoring coefficient)

From the above, the error determining processing unit 430c determines whether the HDD is normal by comparing the error determining coefficient and the error monitoring coefficient.

However, if, in the case of an extremely small number of accesses within a predetermined period, the HDD is determined to be an abnormal HDD on a basis of the above prescribed value of 5%, the HDD with low access load may be erroneously determined to be an abnormal HDD.

The HDD will now be described that has low access load as mentioned above. Since normally the number of accesses occurring to a general HDD per day is hundreds of thousands, if accesses of the order of 1000 per hour occur, the HDD is deemed to be an HDD with low access load.

Therefore, in the present embodiment, the HDD with which the number of accesses per hour is 1000 or below is considered to be the HDD with low access load.

If the error determining processing unit 430c determines the HDD with low access load to be an abnormal HDD on a basis of the error monitoring coefficient of 0.5%, then the frequency of determining the HDD to be an abnormal HDD will be higher, the abnormality determination may not be made properly, and the HDD not needing replacement is replaced wastefully.

From the above, the error determining processing unit 430c, in determining the HDD with low access load, does not determine the HDD to be an abnormal HDD even if the error determining coefficient is in excess of the error monitoring coefficient of 0.5%.

Specific examples will then be described of the processing performed by the error determining processing unit 430c with reference to FIGS. 3 and 4. By way of example, under conditions of the HDD(A) shown in FIG. 3 and period A and period B (decided to be one hour for the sake of convenience) shown in FIG. 4, the error determining processing will be described that is performed by the error determining processing unit 430c.

Firstly, the HDD control unit 430a issues a processing instruction to acquire the data of the NON MEDIUM ERROR COUNT of the HDD and the number of accesses recorded in the information collecting unit 430b to the data processing unit 210a (see FIG. 2).

Next, the error determining processing unit 430c, upon reception of an error processing instruction from the HDD control unit 430a, reads in the NON MEDIUM ERROR COUNT of the HDD(A) and the number of accesses memorized on the control table 420b.

Then, the error determining processing unit 430c acquires "17000", the number of accesses that occurred in the HDD (A) within period B and "350" indicating the cumulative number of the NON MEDIUM ERROR COUNT up to the end of period B.

Since the cumulative number of the NON MEDIUM ERROR COUNT up to the end of period B is 350 commands, the amount of increase of the NON MEDIUM ERROR COUNT within period B is 150 commands.

Therefore, in period B, the NON MEDIUM ERROR COUNT increased by 150 commands for 17000 accesses occurring at the HDD(A).

Based on these conditions, the error determining processing unit 430c performs the error determination of the HDD (A).

Since a formula for calculating the error determining coefficient of the HDD(A) is as follows:

Error determining coefficient of HDD(A)=amount of increase of NON MEDIUM ERROR COUNT/ number of accesses Thus, calculation is made as follows:

150 commands/17000 accesses=0.9% (error determining coefficient of HDD(A))

Therefore, the error determining coefficient of the HDD (A) is 0.9% and is in excess of 0.5% as the error monitoring coefficient.

The amount of increase of the NON MEDIUM ERROR COUNT is 150 commands and if this amount of increase is in excess of the allowable number of errors, then the error determining processing unit 430c determines the HDD(A) to be an abnormal HDD.

The reason of deciding period B as one hour for the sake of convenience is as follows. Even if, in view of the fact that the error monitoring coefficient is calculated by the amount of increase of the NON MEDIUM ERROR COUNT for the number of accesses occurring during a predetermined period, determination is made taking the time during which hundreds of thousands of accesses occur as a collecting period, it takes an extremely long time until detection.

As a result, the abnormal HDD is left as it is for hours and proper abnormality detection may not be performed. Therefore, period B is decided as one hour corresponding to a proper collecting period.

A specific example will then be shown below of the error determination performed by the error determining processing unit 430c with respect to the HDD with low access load.

Description will be given taking example of the HDD(B) and period C (decided to be one hour for the sake of convenience) in FIG. 3. Since FIG. 3 shows that in period C, the number of accesses to the HDD(B) is 1000 accesses per hour, the HDD(B) is deemed to be the HDD with low access load.

FIG. 3 also shows that HDD(B) had the NON MEDIUM ERROR COUNT increased by 20 commands in period C.

Under these conditions, when the error determining processing unit 430c performs the error determination of the HDD(B) with low access load, the result is as follows.

An example will be shown of a specific calculating formula.

Since the amount of increase of NON MEDIUM ERROR COUNT is 20 commands and the number of accesses is 1000 accesses, the error determining coefficient is calculated as follows:

20 commands/1000 accesses=2% (error determining coefficient of HDD(B))

Consequently, the error determining coefficient of the HDD(B) is 2% and is in excess of 0.5% as the error monitoring coefficient but since the HDD(B) is the HDD with low access load, the error determining processing unit 430c does not determine the HDD(B) to be an abnormal HDD.

As described above, in the determination of the HDD with low access load, the error determining processing unit 430c does not determine the HDD to be an abnormal HDD even if the error determining coefficient is in excess of 0.5% as the error monitoring coefficient.

The Disc Patrol executing unit 430d will then be described with reference to FIGS. 2 to 4. The Disc Patrol executing unit 430d is a unit of forcing the number of accesses of the HDD with low access load to increase.

Firstly, the Disc Patrol executing unit 430d issues a Disc Patrol executing instruction to the data processing unit 210a of respective HDDs making up the RAID group.

Then, the data processing unit 210a executes one access within one second to perform a medium diagnosis of a user area within the HDD and two accesses within two seconds to perform a comparison diagnosis of reading-in/writing in a writing area and as a result, executes four accesses in total (medium diagnosis×twice, writing×once, reading-in×once) within two seconds.

Therefore, the data processing unit 210a is capable of generating 7200 accesses per hour to the HDD.

Specific description will be given taking example of the HDD(B). When the number of accesses is of the order of 500 at time D1 (e.g., the time after elapse of about 30 minutes from T3) within period D, the Disc Patrol executing unit 430d, judging that the HDD(B) has a small number of accesses, may increase the number of accesses of the HDD (B) in period D.

As a result, the number of accesses occurring at the HDD (B) in period D should have remained in the order of 1000 accesses but execution of the Disc Patrol causes the number of accesses to be increased to 4600 accesses.

Incidentally, the error determining processing unit 430c, in determining the HDD with low access load, does not determine the HDD to be an abnormal HDD even if the error determining coefficient is in excess of the error monitoring coefficient of 0.5%.

For example, at the HDD(B), only 1000 accesses occurred in period C and only 1000 accesses in period D (with the execution of the Disc Patrol not taken into account) and the error determining processing unit 430c, during period C and period D, considering the HDD(B) as the HDD with low access load, did not performed the abnormality determination (each of periods C and D is decided to be one hour for the sake of convenience).

However, the execution of the Disc Patrol at the HDD(B) forces the number of accesses occurring at the HDD(B) to increase and makes it possible to determine whether the HDD is abnormal with respect to the HDD with low access load as well.

For example, the Disc Patrol executing unit 430d generates 7200 accesses to the HDD(B) in period E (decided to be one hour for the sake of convenience) shown in FIG. 4.

Taking it into account that the error monitoring coefficient indicating the allowable limit of the normal HDD corresponds to 0.5% of the number of accesses and that the data processing unit 210a (see FIG. 2) of the HDD generates 7200 accesses per hour, one example of the allowable number of errors may be shown as follows:

If the number of accesses corresponding to 0.5% of 7200 accesses issued by the Disc Patrol operation is taken as the amount of increase of the NON MEDIUM ERROR COUNT, the calculating formula of the allowable number of errors is as follows:

$$7200 \text{ accesses} \times 0.005 = 36 \text{ (allowable number of errors)}$$

Therefore, the error determining processing unit 430c, using the allowable number of errors, may determine whether the HDD is abnormal with respect to the HDD with low access load as well.

In the above example, in period E, by executing the Disc Patrol processing, 7200 accesses are generated and during this period, the NON MEDIUM ERROR COUNT has increased by 50 commands, which is in excess of the allowable number of errors of 36, and the error determining processing unit 430c determines the HDD(B) to be abnormal.

In the above example, the formula for calculating the error determining coefficient of the HDD(B) is as follows:

In period E, since the number of accesses occurring to the HDD(B) is 7200 and the amount of increase of the NON MEDIUM ERROR COUNT is 50 commands, the error determining coefficient of the HDD(B) is calculated as follows:

$$50 \text{ commands}/7200 \text{ accesses} = 0.7\% \text{ (error determining coefficient of HDD}(B))$$

Therefore, since the error determining coefficient is in excess of the error monitoring coefficient of 0.5% and the amount of increase of the NON MEDIUM ERROR COUNT, which is 50 commands, is in excess of the allowable number of errors of 36, the error determining processing unit 430c determines the HDD(B) to be abnormal.

Now, back to the description of FIG. 1, the disc interface group 440 will be described. The disc interface group 440 is a unit of controlling the transmission and reception of the data between the HDD control device 400 and each HDD within the RAID group.

Figure 5:
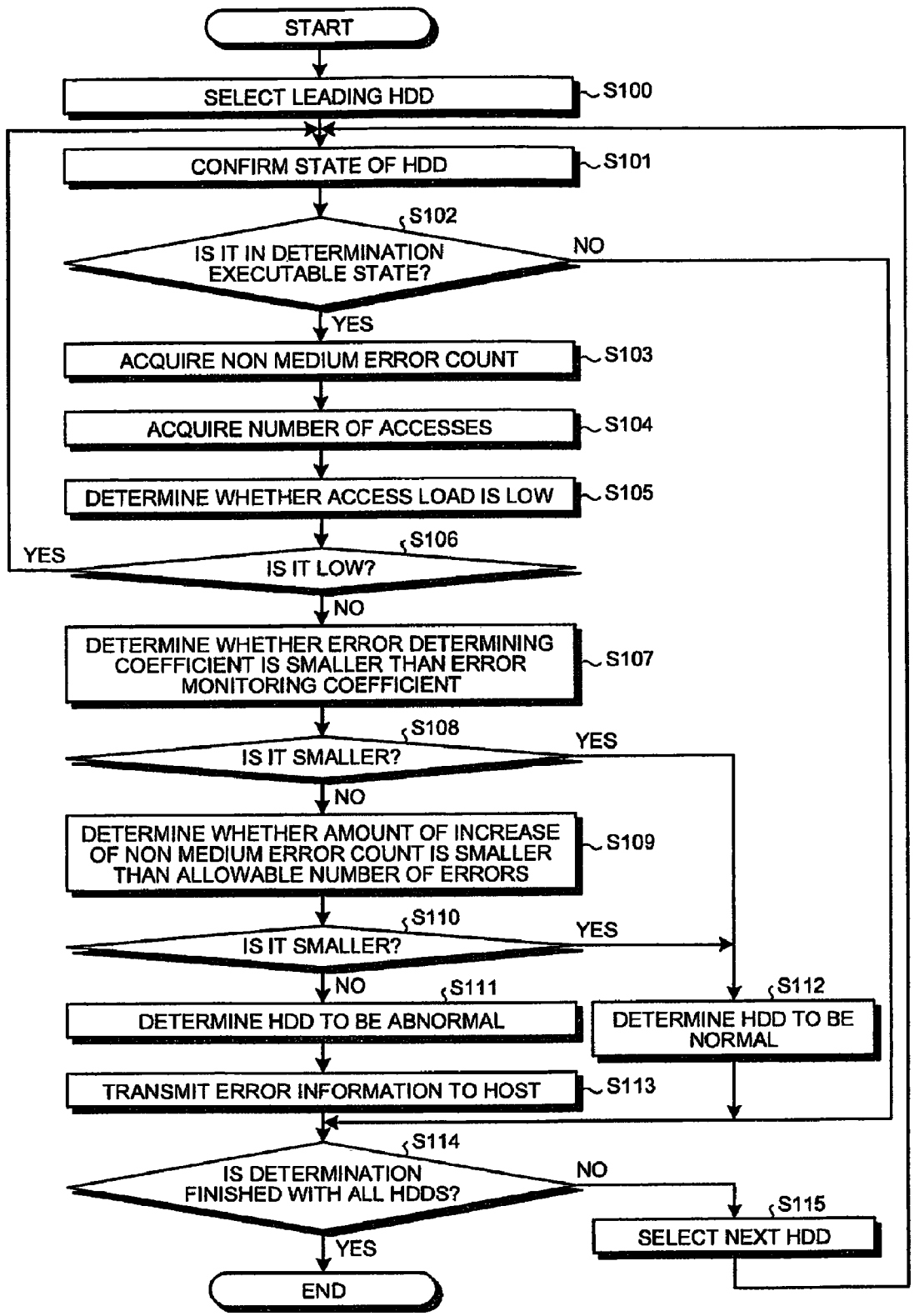
FIG. 5 is a flow chart of error processing of the HDD in the first embodiment.

An error determining procedure will then be described of the error determining processing unit 430c. FIG. 5 is a flow chart of processing by the error determining processing unit 430c.

The error determining processing unit 430c selects a leading HDD within the group (step S100), confirms if the HDD is in a determination executable state (step S101), and, if in the determination executable state (Yes at step S102), acquires the NON MEDIUM ERROR COUNT in the HDD from the control table 420b (step S103).

The determination executable state refers to a state in which execution of this determining processing to the HDD does not cause interference to functions of data writing, reading-out, etc., that are basic functions of the HDD.

The error determining processing unit 430c then acquires the number of accesses within a predetermined period from the control table 420b (step S104) and determines whether the access load is low (step S105).

If the access load is high (NO at step S106), then the error determining processing unit 430c determines whether the error determining coefficient is smaller than the error monitoring coefficient (step S107).

On the other hand, if the access load is low (YES at step S106), then the flow goes to step S101.

If the error determining coefficient is larger than the error monitoring coefficient (NO at step S108), then the error determining processing unit 430c determines whether the amount of increase of the NON MEDIUM ERROR COUNT is smaller than the allowable number of errors (step S109).

On the other hand, if the error determining coefficient is smaller than the error monitoring coefficient (YES at step S108), then the error determining processing unit 430c determines the HDD to be a normal HDD (step S112).

Then, at step S109, if the amount of increase of NON MEDIUM ERROR COUNT is larger than the allowable number of errors (NO at step S110), then the error determining processing unit 430c determines the HDD to be an abnormal HDD (step S111) and transmits error information to the host 50 (step S113).

The error information refers to the information indicating to the host 50 that the HDD has turned out to be a performance-abnormal HDD as a result of comparing the amount of increase of the NON MEDIUM ERROR COUNT with a prescribed value and that the HDD needs replacement.

On the other hand, if the amount of increase of NON MEDIUM ERROR COUNT is smaller than the allowable number of errors (YES at step S110), then the error determining processing unit 430c determines the HDD to be a normal HDD (step S112).

Then, the error determining processing unit 430c determines whether the determination is finished with all HDDs and if the determination is finished with all HDDs (YES at step S114), then the determination comes to an end.

On the other hand, if the determination is not finished with all HDDs (NO at step S114), then the error determining processing unit 430c selects a next HDD (step S115) and goes to step S101.

At step S102, if the HDD is not in the determination executable state (NO at step S102), then the error determining processing unit 430c determines whether the determination is finished with all HDDs (step S114).

Then, if it is determined that the determination is finished with all HDDs (YES at step S114), then the error determining processing unit 430c terminates the determination.

On the other hand, if the determination is not finished with all HDDs (NO at step S114), then the error determining processing unit 430c moves the processing to step S115 and selects an HDD to be determined next (step S115).

Processing will then be described that is performed by the Disc Patrol executing unit 430d. FIG. 6 is a flow chart of Disc Patrol processing.

Firstly, the Disc Patrol executing unit 430d selects an HDD to which the Disc Patrol is to be executed (step S200).

Next, the Disc Patrol executing unit 430d acquires the number of accesses of the selected HDD (step S201) and if the number of accesses is smaller than a predetermined number of accesses (YES at step S202), then the Disc Patrol executing unit 430d issues an execution instruction to the data processing unit 210a of the HDD.

Then, the data processing unit 210a of the HDD in receipt of the execution instruction executes the Disc Patrol processing (step S203).

On the other hand, if the number of accesses is larger than the predetermined number of accesses (NO at step S202), then the Disc Patrol executing unit 430d goes to step S204.

In the case of terminating the execution (YES at step S204), the Disc Patrol executing unit 430d terminates the Disc Patrol processing.

On the other hand, in the case of not terminating the execution (NO at step 204), the Disc Patrol executing unit 430d select a next HDD (step S205).

As described above, the RAID apparatus according to the first embodiment, with the error determining processing unit 430c comparing the error determining coefficient and the error monitoring coefficient and detecting the HDD as an abnormal HDD when the error determining coefficient is in excess of the error monitoring coefficient and furthermore, the amount of increase of the NON MEDIUM ERROR COUNT is in excess of the allowable number of errors, is capable of performing the error determination with respect to the HDD that so far could not be determined to have a performance error.

The error determining processing unit 430c, in the case of determining the HDD with low access load, does not determine the HDD to be an abnormal HDD even if the error determining coefficient is in excess of the error monitoring coefficient. As a result, the RAID apparatus according to the first embodiment is capable of avoiding wasteful abnormality determination and preventing wasteful replacement of the HDD that does not need replacement.

Additionally, the RAID apparatus according to the first embodiment, with the Disc Patrol executing unit 430d causing the data processing unit 210a of the HDD to execute the Disc Patrol processing, is capable of forcing the number of accesses of the HDD with low access load to increase and determining the HDD with which the determination of whether the HDD is abnormal was not performed.

The abnormality determining apparatus according to the embodiments, by accurately detecting the number of errors not attributable to the recording medium on which recording is made by the HDD itself, is capable of error detection as to whether the HDD is a normal HDD and as a result, is capable of the error detection of the HDD that so far could not be judged as having a performance error.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An abnormality determining apparatus comprising:
    a counting unit that counts a number of errors not attributable to a recording medium provided in a storage device and a number of accesses to the recording medium within a predetermined period; and
    an abnormality determining unit that calculates an error determining coefficient which indicates an amount of increase of the number of errors per unit number of accesses based on results of counting by the counting unit and determines whether the storage device is abnormal by comparing the error determining coefficient and a plurality of prescribed values,
    the abnormality determining unit determines that the storage device is abnormal when the error determining coefficient is in excess of a first prescribed value which indicates tolerable response lowering, the error determining coefficient is in excess of a second prescribed value which is obtained by multiplying the number of accesses that enables abnormality determination by a predetermined coefficient, and the number of accesses within the predetermined period is equal to or greater than a predetermined number.

2. The abnormality determining apparatus according to claim 1, further comprising:
    an access number increasing unit that increases a number of accesses to the recording medium when the number of accesses within the predetermined period is less than the predetermined number.

3. The abnormality determining apparatus according to claim 1, wherein
    the number of accesses includes a number of accesses executed from an upper-level device to the recording medium and a number of accesses executed when the storage device itself tests an error attributable to the recording medium.

4. The abnormality determining apparatus according to claim 1, wherein
    the error not attributable to the recording medium is an access delay error.

5. An abnormality determining method comprising:
    counting a number of errors not attributable to a recording medium provided in a storage device and a number of accesses to the recording medium within a predetermined period and storing the number of errors and the number of accesses in the storage device; and
    calculating an error determining coefficient which indicates an amount of increase of the number of errors per unit number of accesses based on the number of errors and the number of accesses stored in the storage device and determining whether the storage device is abnormal by comparing the error determining coefficient and a plurality of prescribed values, wherein the storage device is determined to be abnormal when the error determining coefficient is in excess of a first prescribed value which indicates tolerable response lowering, the error determining coefficient is in excess of a second prescribed value which is obtained by multiplying the number of accesses that enables abnormality determination by a predetermined coefficient, and the number of accesses within the predetermined period is equal to or greater than a predetermined number.

6. The abnormality determining method according to claim 5, further comprising:

increasing a number of accesses to the recording medium when the number of accesses within the predetermined period is less than the predetermined number.

7. The abnormality determining method according to claim 5, wherein the number of accesses includes a number of accesses executed from an upper-level device to the recording medium and a number of accesses executed when the storage device itself tests an error attributable to the recording medium.

8. The abnormality determining method according to claim 5, wherein the error not attributable to the recording medium is an access delay error.

9. An abnormality determining apparatus comprising:

a counting unit that counts a number of errors not attributable to a recording medium provided in a storage device and a number of accesses to the recording medium within a predetermined period; and an abnormality determining unit that calculates an amount of increase of the number of errors per unit number of accesses based on results of counting by the counting unit and determines that the storage device is not abnormal when the results of calculation are in excess of a prescribed value and the number of accesses within the predetermined period is lower than a predetermined number.

* * * * *